United States Patent
Larson et al.

(10) Patent No.: US 9,010,466 B2
(45) Date of Patent: Apr. 21, 2015

(54) UTILITY VEHICLE WITH A CONTINUOUSLY VARIABLE TRANSMISSION HAVING A SYSTEM FOR SELECTIVELY ESTABLISHING A FIXED MAXIMUM TRANSMISSION RATIO

(71) Applicants: Jamie R. Larson, Farmington, MN (US); Jeremy A. Fohrenkamm, River Falls, WI (US)

(72) Inventors: Jamie R. Larson, Farmington, MN (US); Jeremy A. Fohrenkamm, River Falls, WI (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 14/273,134

(22) Filed: May 8, 2014

(65) Prior Publication Data
US 2014/0332307 A1 Nov. 13, 2014

Related U.S. Application Data

(60) Provisional application No. 61/821,997, filed on May 10, 2013.

(51) Int. Cl.
*F16H 9/18* (2006.01)
*B60K 17/08* (2006.01)
(Continued)

(52) U.S. Cl.
CPC ....... *B60K 17/08* (2013.01); *F16H 2061/66213* (2013.01); *F16H 63/065* (2013.01); *F16H 9/18* (2013.01); *F16H 55/563* (2013.01)

(58) Field of Classification Search
CPC . F16H 9/125; F16H 9/18; F16H 2061/66213; F16H 55/563
USPC .................... 180/53.1, 366; 474/8, 12, 13, 18
See application file for complete search history.

(56) References Cited

U.S. PATENT DOCUMENTS 4,020,711 A * 5/1977 Woollard ........................ 474/13
6,092,617 A 7/2000 White, III et al.
(Continued)

FOREIGN PATENT DOCUMENTS

| EP | 1262690 | 12/2002 |
|---|---|---|
| EP | 1847731 | 10/2007 |

(Continued)

OTHER PUBLICATIONS

WIPO, International Search Report and Written Opinion, Sep. 18, 2014.

*Primary Examiner* — Ruth Ilan
(74) *Attorney, Agent, or Firm* — James W. Miller (57) ABSTRACT

A continuously variable transmission for a vehicle comprises a primary pulley, a secondary pulley, and a belt entrained around both pulleys in an opposite manner between the fixed and movable sheaves thereof. One pulley carries a selectively deployable stop that may be placed into position to mechanically limit the range of motion between the fixed and movable sheaves. This establishes an actual maximum transmission ratio that is larger than the nominal minimum transmission ratio but smaller than the nominal maximum transmission ratio achievable by the transmission during normal operation thereof. When such a transmission is used on a utility vehicle attached to a substance dispensing applicator operatively driven by the vehicle's engine, the application rate stays substantially constant despite changes in engine speed when the user keeps the transmission upshifted to the actual maximum transmission ratio set by the position of the deployed stop.

20 Claims, 9 Drawing Sheets

(51) Int. Cl.
*F16H 55/56* (2006.01)
*F16H 61/662* (2006.01)
*F16H 63/06* (2006.01)

(56) References Cited

U.S. PATENT DOCUMENTS

| | | |
|---|---|---|
| 6,149,540 A | 11/2000 | Johnson et al. |
| 6,358,181 B1 | 3/2002 | Friedmann et al. |
| 8,047,310 B2 | 11/2011 | Kallevig |
| 2003/0134706 A1 | 7/2003 | Belloso |
| 2003/0168272 A1 | 9/2003 | Ono et al. |
| 2006/0252589 A1 * | 11/2006 | Tay ................................ 474/83 |

FOREIGN PATENT DOCUMENTS

| | | |
|---|---|---|
| JP | 63028737 | 2/1988 |
| JP | 2006170387 | 6/2006 |
| WO | 2010085868 | 8/2010 |

* cited by examiner

UTILITY VEHICLE WITH A CONTINUOUSLY VARIABLE TRANSMISSION HAVING A SYSTEM FOR SELECTIVELY ESTABLISHING A FIXED MAXIMUM TRANSMISSION RATIO

TECHNICAL FIELD

This invention relates to a utility vehicle used for outdoor work purposes such as ground or turf grooming operations, construction activities, farm or ranch tasks, and the like. More particularly, this invention relates to a utility vehicle that has a traction drive train which includes a continuously variable transmission.

BACKGROUND OF THE INVENTION

Utility vehicles are small, open vehicles designed for carrying a driver and a passenger in a side-by-side configuration at the front of the vehicle with a load carrying dump box being situated behind them. When used in the ground or turf grooming industry, the vehicle dump box might carry a pile of dirt or sand, or a plurality of rolls of sod, or many other things that are typically used for establishing, grooming or repairing ground or turf surfaces, such as the grass or sand traps found on a golf course. In addition to their basic load carrying and transportation functions, utility vehicles are often used as a platform for directly carrying or for towing various other ground or turf working implements. The Workman® utility vehicles manufactured and sold by The Toro Company, the assignee of this invention, are typical utility vehicles of the type being described here.

Utility vehicles can be converted to sprayers by removing the dump box and by mounting a sprayer in its place. The sprayer includes a tank for holding a liquid, e.g., a liquid fertilizer, herbicide, pesticide or combination thereof, that is to be sprayed atop the ground or turf surface. The tank occupies much of the space that had previously been filled by the dump box. One or more spray booms are carried at the rear of the vehicle with the booms themselves carrying a plurality of laterally spaced, downwardly facing spray nozzles. A spray pump is coupled to a drive shaft of the engine of the vehicle for pumping the liquid out of the tank and through the nozzles on the booms for application to the ground or turf surface as the vehicle is driven over such surface. Since the rotational speed of the spray pump is governed by the rotational speed of the engine, the application rate of the spray liquid is proportional to the rotational speed of the engine.

The use of a belt type continuously variable transmission (CVT) in the drive train of a utility vehicle is documented in US Patent Application Publication 2005/0079937. The use of a CVT provides various advantages over the gear-shift based manual standard transmissions which have been more commonly used in utility vehicles. For one thing, a CVT is an automatic transmission that requires no manual shifting by the operator. Moreover, a CVT is able to provide smooth uninterrupted power without the shift steps and the resulting jerk of standard transmissions.

When a utility vehicle is used as a sprayer as described above, a desired application rate of the sprayed liquid, defined by the amount of spray per unit of area, can be achieved by calibrating and establishing a fixed rate of flow through the spray nozzles relative to the fixed gear ratio of the standard transmission when the utility vehicle is operated in a selected gear of the standard transmission. Then, when the vehicle is driven in the selected gear and since the spray pump and standard transmission are both directly driven by the engine, the application rate is insensitive to vehicle ground speed and will remain substantially constant whether the vehicle is on flat ground, or is going up a hill, or is going down a hill. For example, if going up a hill, the vehicle may slow down through engine lug, but the rotational speed of the spray pump will correspondingly slow down as it is also being driven by the engine. When going down a hill, the vehicle may speed up with the engine speed also increasing, but again the rotational speed of the spray pump will correspondingly increase. In either case, the application rate remains constant.

However, it is the nature of a CVT to provide a continuously changing and varying transmission ratio during operation of the vehicle. For example, when the vehicle is climbing a hill and the vehicle ground speed decreases, a CVT will automatically downshift to a lower transmission ratio. Conversely, when the vehicle is going down a hill and the vehicle ground speed increases, the CVT will automatically upshift to a higher transmission ratio. Transmission ratio is the number of times the output shaft of the CVT revolves for each revolution of the engine, a higher transmission ratio providing more revolutions of the output shaft of the CVT than a lower higher transmission ratio for each revolution of the engine. These constant changes in transmission ratio do not permit one to maintain a constant application rate as the rate of flow through the spray nozzles remains constant despite these variations in the vehicle ground speed.

In order to maintain a substantially constant application rate, one could attempt to create a feedback control loop that would change the rate of flow through the spray nozzles in concert with ground speed. However, this is a relatively expensive and complex control system that is not economically suited for the fairly simple spray operations of the type that would be conducted by utility vehicles. A simpler and more cost effective solution is desirable for allowing a CVT equipped utility vehicle to function as an effective sprayer.

SUMMARY OF THE INVENTION

One aspect of this invention relates to a belt type continuously variable transmission for the traction drive train of a vehicle. The transmission comprises at least one pulley comprising an axially fixed sheave and an axially movable sheave carried on a rotatable shaft. A flexible belt engages between the sheaves. A plurality of movable members are provided that are responsive to centrifugal force for pushing the fixed sheave towards the movable sheave to thereby change the position of the belt between the sheaves to continuously change a transmission ratio provided by the transmission between a nominal minimum transmission ratio and a nominal maximum transmission ratio. A selectively deployable stop is carried on the at least one pulley with the stop being selectively movable relative to the sheaves between a non-deployed position and at least one deployed position. The stop is configured such that in the non-deployed position thereof the stop has no effect on the transmission ratios available from the transmission such that the transmission can continuously shift between its nominal minimum and maximum transmission ratios. The stop is further configured such that in the at least one deployed position thereof the stop is repositioned on the at least one pulley to mechanically limit the relative motion between the fixed and movable sheaves to a range of motion that is smaller than a range of motion provided in normal operation of the transmission but without the stop protruding into the path of or interfering with the operation of the centrifugal force responsive members. Thus, the stop in the at least one deployed position thereof provides an actual maximum transmission ratio that is lower than the nominal maximum transmission ratio but higher than the nominal minimum transmission ratio with the centrifugal force responsive members still being able to operate to continuously shift the transmission between the nominal minimum transmission ratio and the actual maximum transmission ratio set by the position of the stop in the at least one deployed position thereof.

Another aspect of this invention relates to a utility vehicle for performing operations on a ground or turf surface. The utility vehicle comprises a frame that is supported for rolling over the ground by a plurality of ground engaging wheels. A prime mover is carried on the frame with the prime mover having a rotatable drive shaft. A drive train is operatively connected to at least one wheel for rotatably driving the at least one wheel for propelling the frame over the ground or turf surface. The drive train includes a belt type continuously variable transmission operatively connected between the drive shaft of the prime mover and the at least one wheel for driving the at least one wheel and thereby the frame at variable ground speeds. The transmission comprises at least one pulley comprising an axially fixed sheave and an axially movable sheave carried on a rotatable shaft, a flexible belt that engages between the sheaves, a plurality of movable members that are responsive to centrifugal force for pushing the fixed sheave towards the movable sheave to thereby change the position of the belt between the sheaves to continuously change a transmission ratio provided by the transmission between a nominal minimum transmission ratio and a nominal maximum transmission ratio, and a selectively deployable stop carried on the at least one pulley with the stop being selectively movable relative to the sheaves between a non-deployed position and at least one deployed position. The stop is configured such that in the non-deployed position thereof the stop has no effect on the transmission ratios available from the transmission such that the transmission can continuously shift between its nominal minimum and maximum transmission ratios. The stop is further configured such that in the at least one deployed position thereof the stop is repositioned on the at least one pulley to mechanically limit the relative motion between the fixed and movable sheaves to a range of motion that is smaller than a range of motion provided in normal operation of the transmission, whereby the stop in the at least one deployed position thereof provides an actual maximum transmission ratio that is lower than the nominal maximum transmission ratio but higher than the nominal minimum transmission ratio to limit a maximum ground speed of the frame. Finally, an applicator is operatively attached to the frame for being propelled over the ground or turf surface by motion of the frame over the ground or turf surface. The applicator is operatively powered directly or indirectly by the drive shaft of the prime mover for dispensing substances onto the ground or turf surface at an application rate that is proportional to the rotational speed of the drive shaft of the prime mover. A desired application rate for such substances can be calculated and set for the ground speed of the frame when the stop of the transmission is in the at least one deployed position thereof establishing the actual maximum transmission ratio. Thus, the application rate of the substance will remain substantially constant when the utility vehicle is operated by the user with the transmission upshifted to the actual maximum transmission ratio established by the at least one deployed position of the stop even though the rotational speed of the drive shaft of the prime mover may vary as the utility vehicle goes up or down hills.

BRIEF DESCRIPTION OF THE DRAWINGS

This invention will be described more specifically in the following Detailed Description, when taken in conjunction with the following drawings, in which like reference numerals refer to like elements throughout.

DETAILED DESCRIPTION

Figure 1:
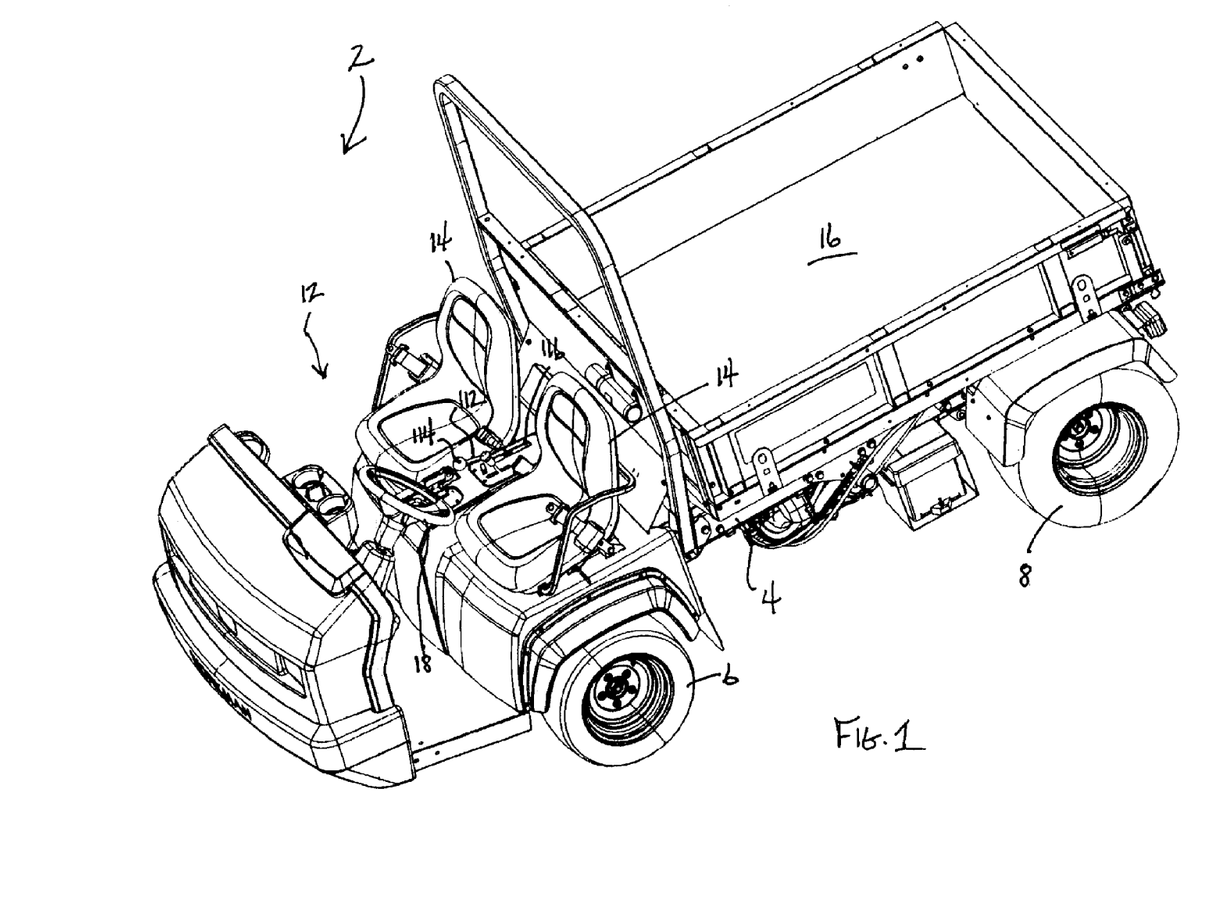
FIG. 1 is a perspective view of a utility vehicle that incorporates the improved CVT of this invention.

One embodiment of a utility vehicle which could advantageously use this invention is illustrated in FIG. 1 generally as 2. Vehicle 2 includes a frame 4 that is supported for rolling over the ground by a pair of front wheels 6 and a pair of rear wheels 8. Vehicle 2 also includes a drive train, illustrated generally as 10 in FIGS. 2 and 3, for powering front wheels 6 and rear wheels 8 in a four wheel drive (4WD) configuration to cause vehicle 2 to be self-propelled. Vehicle 2 shown in FIG. 1 is a utility vehicle from the Workman® line of utility vehicles manufactured and sold by The Toro Company, the assignee of this invention.

An open front compartment 12 is provided on frame 4 for carrying a driver and a passenger in side-by-side seats 14. A hydraulically actuated, pivotal dump box 16 is carried on frame 4 and extends from behind front compartment 12 to the rear end of vehicle 2. Front wheels 6 of vehicle 2 are steerable by the driver using a steering wheel 18 in advance of driver's seat 14. A center console 20 between seats 14 carries various operational controls for drive train 10 and dump box 16. One of the drive train controls, which will be discussed in detail hereafter, is newly added to console 20 as part of this invention.

Figure 2:
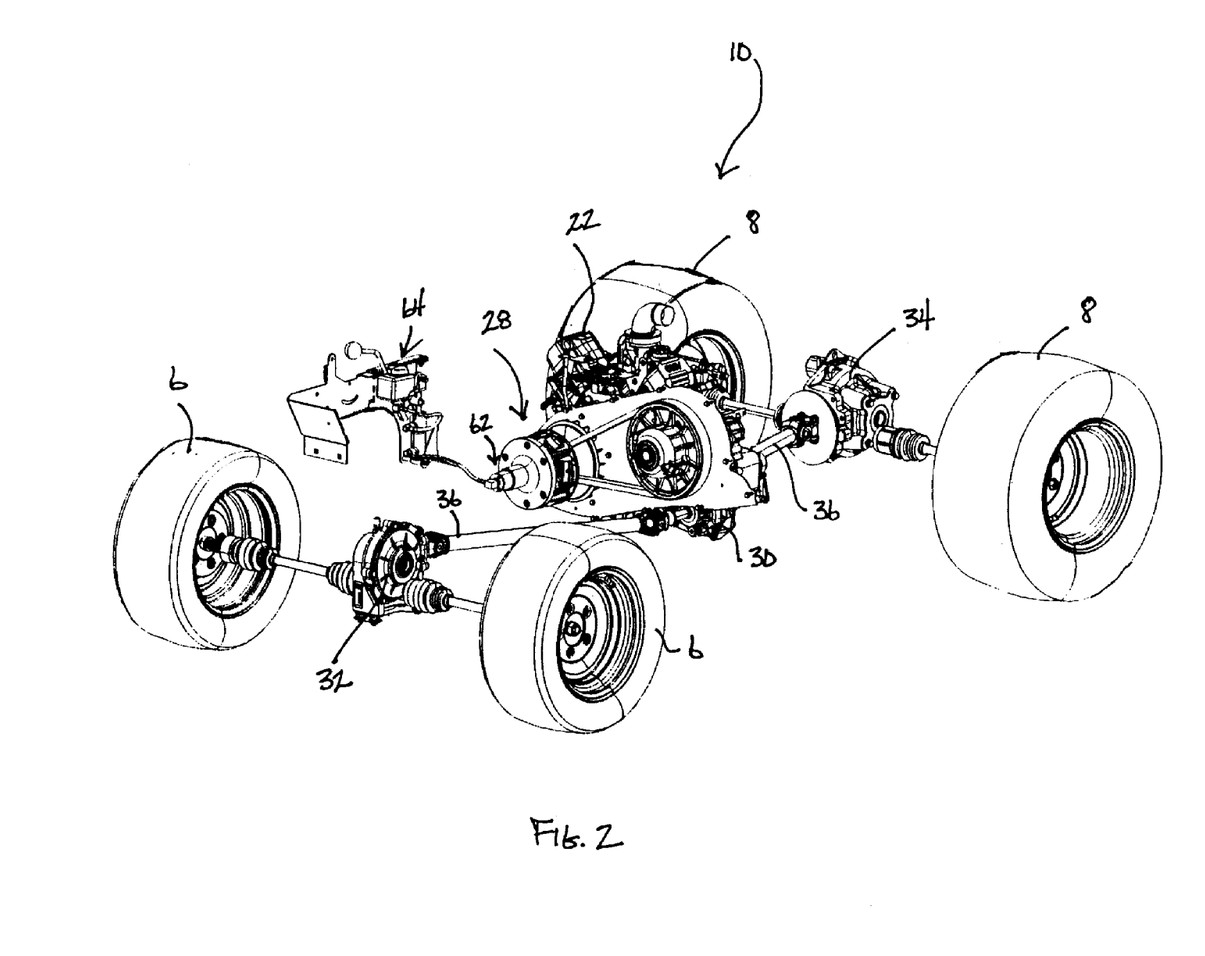
FIG. 2 is a perspective view a portion of the vehicle of FIG. 1, particularly illustrating the drive train components of the vehicle taken from the front of the vehicle of FIG. 1.
Figure 3:
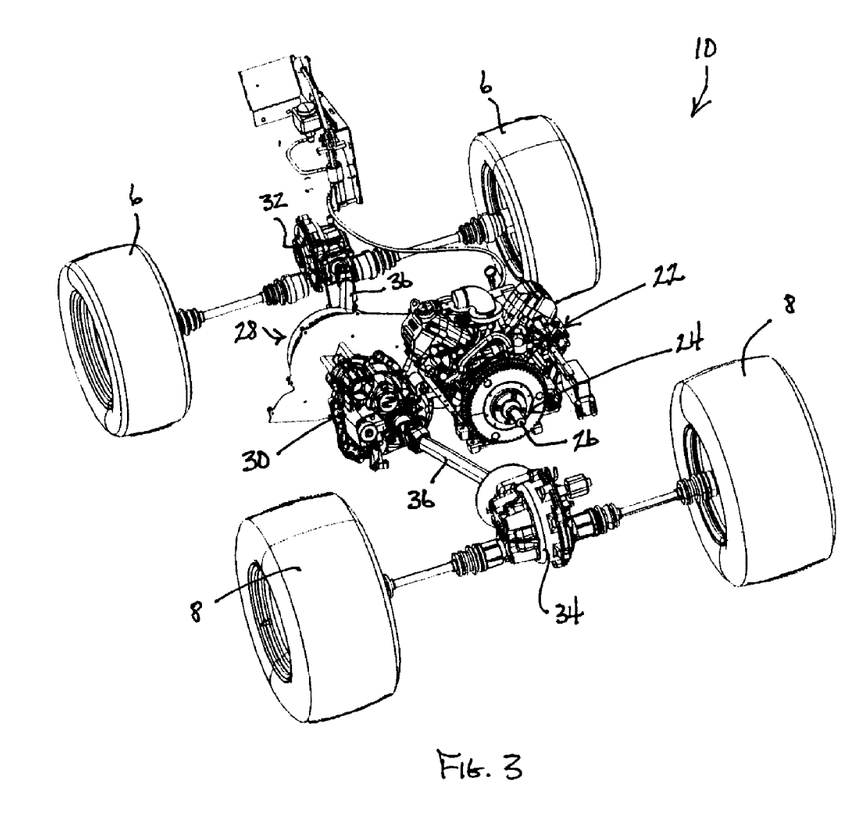
FIG. 3 is a perspective view similar to FIG. 2 but taken from the rear of the vehicle of FIG. 1.

Referring now to FIGS. 2 and 3, drive train 10 includes an internal combustion engine 22 that is mounted in any suitable manner on frame 4 beneath dump box 16. Engine 22 has a crankshaft 24 with a forwardly projecting front end (not shown) and a rearwardly projecting rear end 26 that is visible in FIG. 3. The front and rear ends of engine crankshaft 24 serve as power take off (PTO) shafts. This allows the power of engine 22 to be used by the remaining components of drive train 10 for traction drive purposes via connection of such components to the front end of engine crankshaft 24. This also allows engine 22 to power various auxiliary components via connection to rear end 26 of engine crankshaft 24. These auxiliary components may comprise a first hydraulic fluid pump used for supplying pressurized hydraulic oil for power steering and/or for lifting and lowering dump box 16 through a hydraulic cylinder and/or an additional fluid pump used when vehicle 2 is converted to or equipped with a sprayer or other hydraulically powered implement. The sprayer or other implement could in some cases be alternatively directly mechanically driven from rear end 26 of crankshaft 24 rather than being indirectly hydraulically driven through the additional fluid pump.

Returning to the remaining components of drive train 10, the front end of engine crankshaft 24 is coupled to the input shaft of a belt type continuously variable transmission (CVT) illustrated generally as 28 in FIGS. 2 and 3. Various shrouds or covers for CVT 28 have been removed in the figures of this application for the purpose of better illustrating CVT 28. The output shaft of CVT 28 is the input to a gearbox 30 that provides the driver with the ability to select a high or low speed range or reverse. Gearbox 30 has two output shafts which drive a front differential 32 and a rear differential 34 through conventional connecting shafts 36 often referred to as propeller shafts or Cardan shafts. Front differential 32 is an automatically engaging differential that drives front wheels 6 of vehicle 2. Rear differential 34 similarly drives rear wheels 8 of vehicle 2 but can be electrically locked when actuated by the driver when so desired for increased traction.

The belt type CVT 28 as used in vehicle 2 is itself generally well known in the vehicle art with the exception of various modifications to the cover of the primary clutch of CVT 28 as will be described in more detail hereafter. U.S. Pat. No. 6,149,540, which is hereby incorporated by reference, contains a useful description of a belt type CVT as used in this invention. However, a brief overall summary of the structure and operation of CVT 28 will now be set forth to allow the reader to better understand the improvements made to CVT 28 by this invention.

Figure 4:
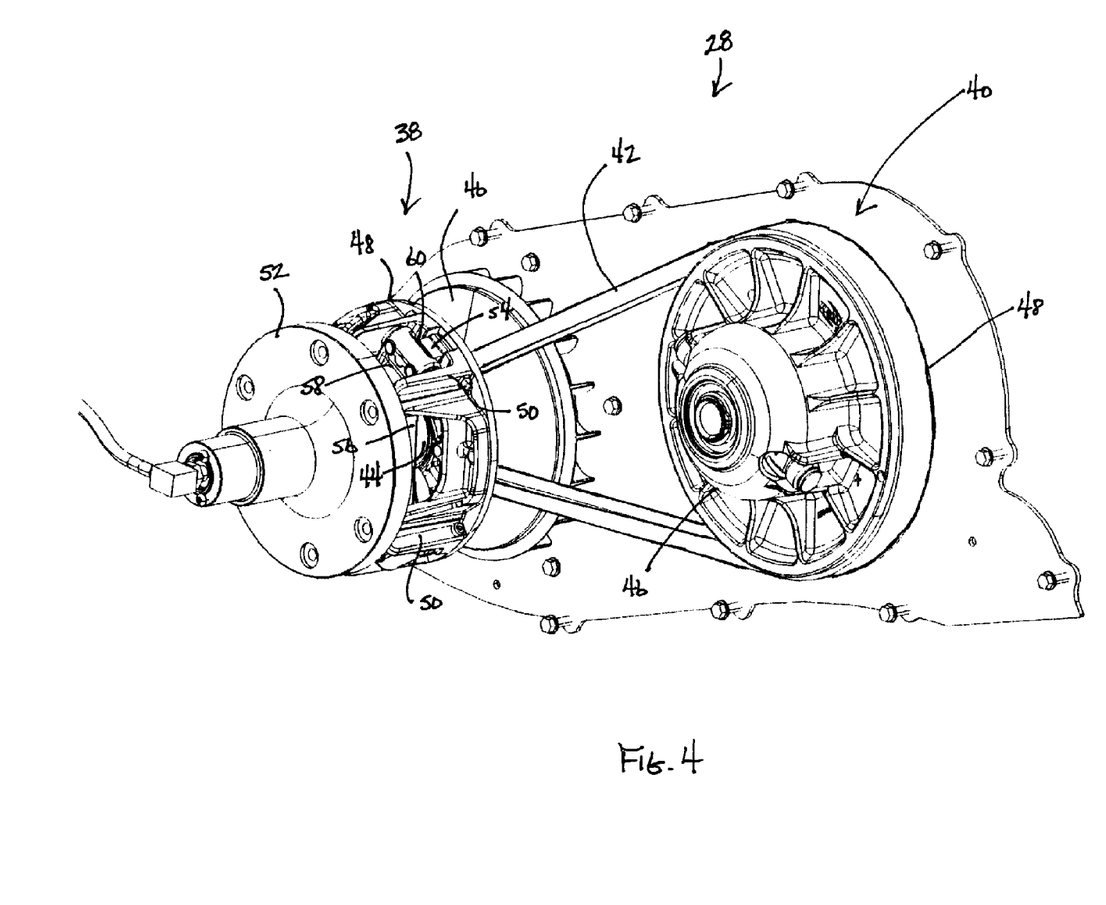
FIG. 4 is a perspective view of a CVT that is part of the drive train of the vehicle of FIG. 1.

Referring now to FIG. 4, CVT 28 includes a primary clutch 38 and a secondary clutch 40 that are connected to one another by a rubber belt 42. Each clutch 38, 40 has a central shaft 44 that carries a first sheave 46 that is fixed to central shaft 44, referred to herein as fixed sheave 46, and a second sheave 48 that is rotatively coupled to but is also axially slidable on central shaft 44, referred to herein as movable sheave 48. During operation of CVT 28, movable sheave 48 of primary clutch 38 axially slides towards and away from fixed sheave 46 to vary the axial distance therebetween. Central shaft 44 of primary clutch 38 is rotatively coupled to the first end of engine crankshaft 24. Central shaft 44 of secondary clutch 40 is rotatively coupled to the input shaft of gearbox 30.

Movable sheave 48 of primary clutch 38 has a plurality of circumferentially spaced posts 50 that extend parallel to central shaft 44 of movable sheave 48 from a backside of the tapered belt engaging face of movable sheave 48. A cover 52 is secured to posts 50 by a plurality of bolts (not shown) such that posts 50 and cover 52 form a cage like structure projecting to one side of movable sheave 48. The cage like structure is, in effect, part of movable sheave 48 in terms of rotary and axial motion of movable sheave 48. In addition, movable sheave 48 also includes a plurality of flyweights 54 that are pivotally secured between selected pairs of posts 50 for pivotal motion about a substantially horizontal axis. A portion of one flyweight 54 is visible in FIG. 4.

The cage like structure of movable sheave 48 of primary clutch 38 surrounds a spider 56 that is secured to central shaft 44 for rotation with central shaft 44. Each arm 58 of spider 56 carries a laterally extending pin 60 with one arm 58 of spider 56 and one pin 60 being visible in FIG. 4. There are as many arms 58 and pins 60 on spider 56 as there are flyweights 54 on movable sheave 48. Each 60 pin on spider 56 has one flyweight 54 adjacent thereto with a contoured body of flyweight 54 underlying pin 60.

When engine 22 is rotating and primary clutch 38 is spinning, flyweights 54 will react to centrifugal force and will pivot upwardly to engage against pins 60 of movable sheave 48. The contoured bodies of flyweights 54 will push against pins 60 to laterally shift movable sheave 48, posts 50, cover 52 and flyweights 54 as a single unit in a direction towards fixed sheave 46 to close the gap between the opposed tapered faces of fixed sheave 46 and movable sheave 48. As this gap begins to close, primary clutch 38 first grips belt 42 with enough force to cause belt 42 to begin rotating to thereby transfer power to secondary clutch 40. Eventually, as more and more force is exerted by flyweights 54 as the rotational speed of engine 22 continues to increase and CVT 28 continues to upshift, the additional lateral shifting of movable sheave 48 and the components carried thereby cause belt 42 to ride upwardly away from central shaft 44 towards the top of the belt engaging faces of fixed sheave 46 and movable sheave 48 as the gap gets progressively narrower. Eventually, at a full shift condition, belt 42 will have moved upwardly between fixed sheave 46 and movable sheave 48 of primary clutch 38 all the way from the bottom to the top of the sheaves with the diameter of belt 42 around primary clutch 38 having changed from a minimum diameter to a maximum diameter during this process.

The opposite action occurs within secondary clutch 40 of CVT 28, which has a larger diameter than that of primary clutch 38. As belt 42 begins to ascend between the faces of fixed sheave 46 and movable sheave 48 of primary clutch 38 and the diameter around primary clutch 38 increases, belt 42 gets tighter. The increasing force of belt 42 on fixed sheave 46 and movable sheave 48 of secondary clutch 40 (as well as any loads experienced by secondary clutch 40 from gearbox 30) progressively forces fixed sheave 46 and movable sheave 48 of secondary clutch 40 apart to widen the gap therebetween to allow belt 42 to begin to drop down between the belt engaging faces of fixed sheave 46 and movable sheave 48 of secondary clutch 40. Eventually, at full shift belt 42 will have its maximum diameter around primary clutch 38 and its minimum diameter around secondary clutch 40.

Thus, CVT 28 has a nominal minimum transmission ratio when belt 42 has been gripped enough to begin rotating but with belt 42 having its minimum diameter around primary clutch 38 and its maximum diameter around secondary clutch 40. Belt 42 has a nominal maximum transmission ratio when CVT 28 has upshifted far enough that the reverse belt configuration has occurred, i.e. belt 42 has its maximum diameter around primary clutch 38 and its minimum diameter around secondary clutch 40. As CVT 28 responds to engine rpm and load conditions in drive train 10, it is able to smoothly vary the transmission ratio between these minimum and maximum ratios in a continuously or infinitely variable manner rather than in a stepwise manner.

The description of the structure and operation of CVT 28 provided above is true for many known belt type CVT's, including that shown in the '540 patent incorporated by reference herein. No part of this prior description involves the improvement to CVT 28 that is involved in the embodiment of the invention under consideration here. That improvement and the reasons for it will now be described.

Figure 5:
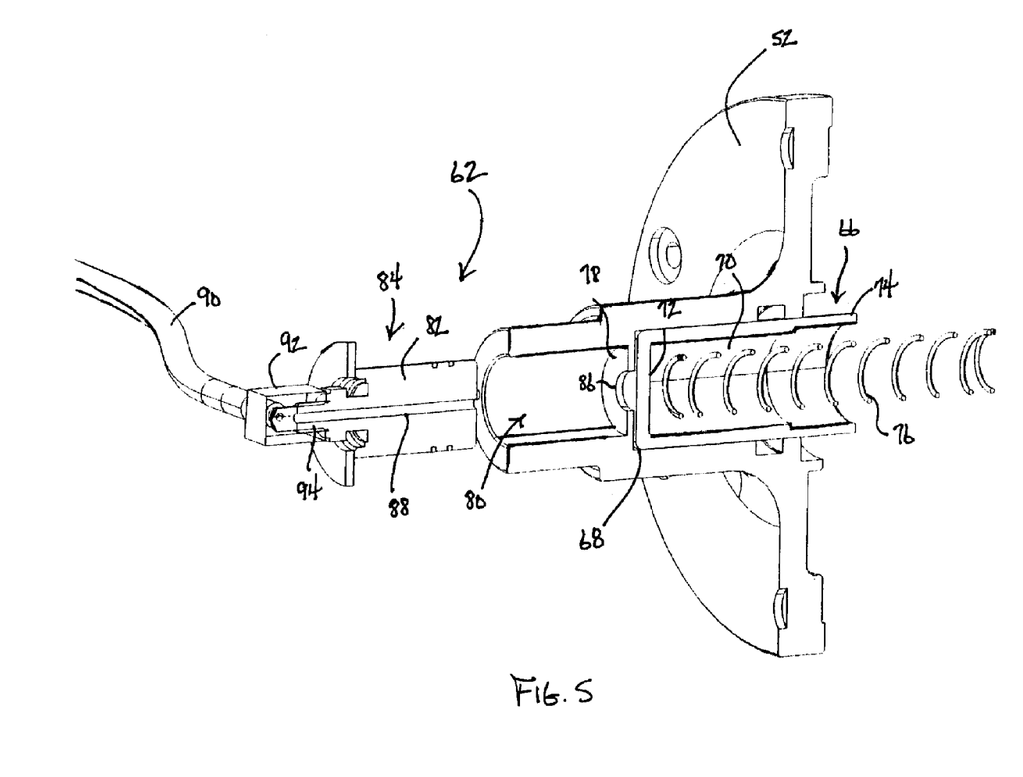
FIG. 5 is a cross-sectional, partially exploded view of the cover of the CVT of FIG. 4, particularly illustrating the rotary union, the piston stop housed within a cylinder formed in the cover, and the retraction spring that have been added by this invention to the cover of the primary clutch of the CVT for the purpose of preventing full upshift of the CVT when the piston stop is extended by fluid pressure out of the cylinder in which the piston stop is housed in the cover.
Figure 6:
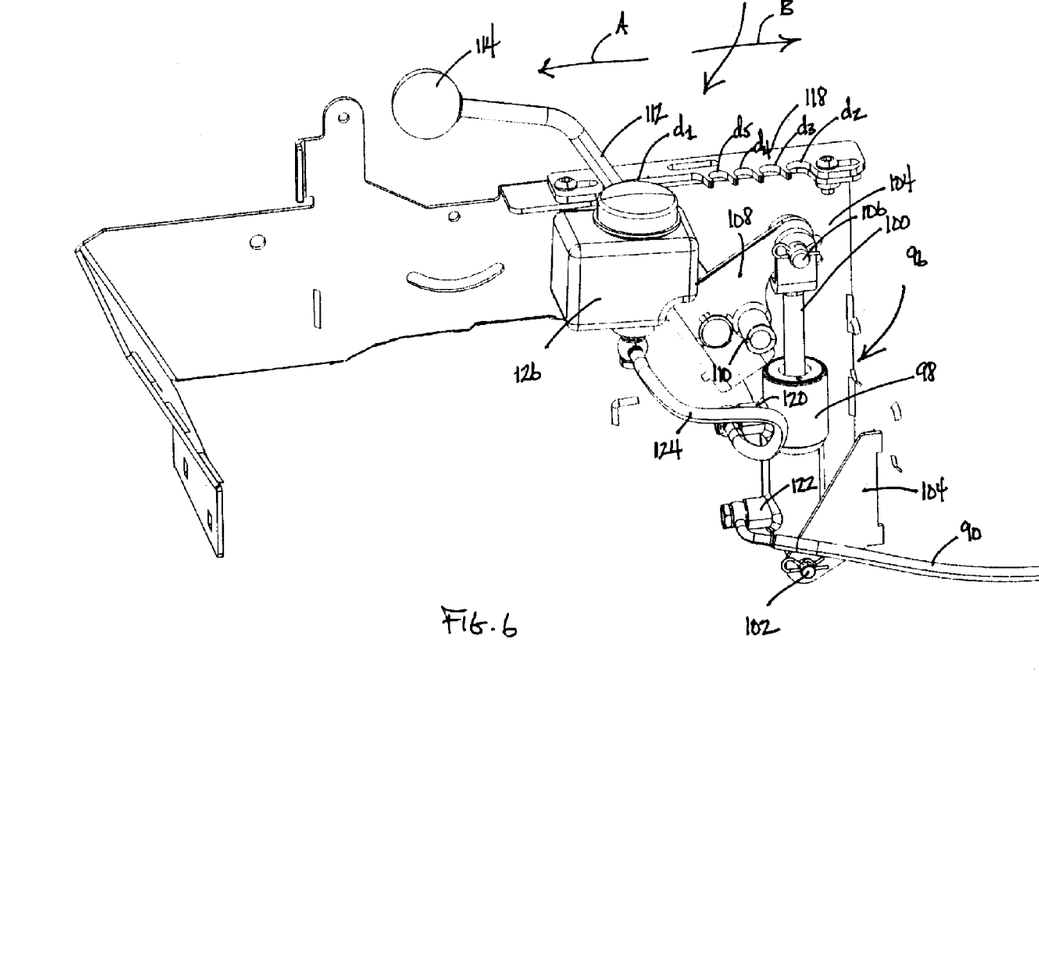
FIG. 6 is a perspective view of a hand operated fluid cylinder that acts as pump that has been added by this invention to the vehicle for supplying fluid pressure to the cylinder in the cover of the primary clutch of the CVT to extend the piston stop and for withdrawing fluid pressure from the cylinder in the primary clutch of the CVT when the piston stop is to be retracted.

Referring now first to FIGS. 5 and 6, this invention is directed to a system that allows the driver of vehicle 2 to selectively establish at least one maximum transmission ratio for CVT 28 for use when vehicle 2 is operating that is lower than the nominal maximum transmission ratio for which CVT 28 was designed. This system has two primary parts: 1.) a selectively deployable stop added to primary clutch 38 of CVT 28 to prevent CVT 28 from fully upshifting during operation of vehicle 2, and 2.) an actuator accessible to the driver to allow the driver to selectively deploy or not the stop as may be desired. The selectively deployable stop is illustrated generally as 62 in FIG. 5. The actuator is illustrated generally as 64 in FIG. 6.

In one embodiment as shown in FIG. 5, stop 62 includes a fluid operated piston stop 66 that is housed within a first cylinder 68 that is formed internally within cover 52 of primary clutch 38. Piston stop 66 comprises a hollow tube 70 having an outwardly facing closed end 72 and an inwardly facing open end 74. A spring 76 is inserted into hollow tube 70 with spring 76 having an inner end that bears against a portion of CVT 28 and an outer end that bears against closed end 72 of hollow tube 70. When CVT 28 is assembled, spring 76 is normally under compression to thereby bias piston stop 66 formed by hollow tube 70 into a retracted position relative to primary clutch 38. In the retracted position of piston stop 66, closed end 72 of hollow tube 70 is brought into a close or abutting engagement with a cross wall 78 that marks the outer end of first cylinder 68 in which piston stop 66 is slidable. Piston stop 66 is designed to be fluid tight with first cylinder 68 with various seals (not shown) being provided between the outer diameter of piston stop 66 and the inner diameter of first cylinder 68.

Cover 52 includes an adjacent second cylinder 80 that receives a cylindrical body 82 of a rotary union 84. Rotary union 84 is shown in an exploded form pulled out of cover 52 in FIG. 5 for the purpose of clarity. Second cylinder 80 containing rotary union 84 is separated from first cylinder 68 containing piston stop 66 by cross wall 78. Cross wall 78 has a circular aperture 86 to permit fluid that has passed through an internal fluid supply passageway 88 in rotary union 84 to be received within first cylinder 68 to act against closed end 72 of hollow tube 70 that forms piston stop 66. Fluid supply passageway 88 in rotary union 84 is supplied with fluid by a first supply hose 90 and a fitting 92 connected to the nipple 94 of rotary union 84. First supply hose 90 and fitting 92 remain stationary as other portions of rotary union 84 rotate along with primary clutch 38. Body 82 of rotary union 84 will be sealed against leakage with respect to second cylinder 80 in cover 52 in which rotary union 84 is housed.

Turning now to FIG. 6, actuator 64 in one embodiment comprises a hand operated, fluid supply pump 96 comprising a pump cylinder 98 that houses an internal pump piston (not shown in FIG. 6). The pump piston has a stem 100 that extends upwardly through various seals such that an upper end of pump piston stem 100 is external of pump cylinder 98. The lower end of pump cylinder 98 is pivotally coupled by a lower pivot pin 102 to various walls 104 in frame 4 of vehicle 2. The upper end of pump piston stem 100 is pivotally connected by an upper pivot pin 106 to one arm of a bell crank 108.

Bell crank 108 is pivotally connected to one wall 104 in frame 4 of vehicle 2 by a pivot shaft 110. An elongated handle 112 is clamped or otherwise secured to the other arm of bell crank 108. Handle 112 extends upwardly and forwardly from bell crank 108 and terminates in a knob 114 that is positioned above console 20 in front compartment 12 of vehicle 2 with handle 112 passing downwardly through a slot 116 (shown in FIG. 1) in the top of console 20 to be secured to bell crank 108. The driver can pivot handle 112 and thus bell crank 108 about the horizontal axis of pivot shaft 110 of bell crank 108 by moving the upper portion of handle 112 and knob 114 forwardly or rearwardly as shown by the arrows A and B in FIG. 6.

Handle 112 is shown in FIG. 6 in its most forward position. Normally, handle 112 is laterally canted slightly to the side by a biasing device, such as a laterally acting spring (not shown), to allow handle 112 to abut against a detent plate 118 that is part of console 20 and that underlies slot 116 in the top of console 20. As shown in FIG. 6, detent plate 118 has a first rather elongated detent $d_1$ at the front of detent plate 118 in which handle 112 is currently received in FIG. 6. The rear of detent plate 118 contains a plurality of four shorter, additional detents $d_2$-$d_5$ with any one of these additional detents also being capable of holding and retaining handle 112 in a selected, adjusted position. To move handle 112 between the various positions afforded by detent plate 118, the driver pulls handle 112 to the side to disengage it from detent plate 118 and then pivots detent plate 118 through slot 116 in console 20 in the appropriate direction A or B to align handle 112 with the selected detent. If the operator then releases handle 112, the bias of the biasing device will tilt handle 112 into engagement with the selected detent and hold handle 112 in that detent.

Pump cylinder 98 has an upper fluid supply port 120 and a lower fluid supply port 122. Lower fluid supply port 122 is connected by first supply hose 90 to rotary union 84 as previously described. Upper fluid supply port 120 is connected by a second fluid supply hose 124 to a reservoir 126 fixed or attached in some fashion to frame 4 of vehicle 2. Reservoir 126 contains an incompressible fluid. It is the purpose of pump 96 to pump fluid to rotary union 84 in primary clutch 38 of CVT 28 when the driver pivots handle 112 from the position in which it is shown in FIG. 6 in the direction of arrow B in FIG. 6. This pivoting motion causes the pump piston to descend within pump cylinder 98 to afford a pump stroke. The fluid passing into primary clutch 38 of CVT 28 is what acts on piston stop 66 to extend piston stop 66 inwardly relative to cover 52 of primary clutch 38 of CVT 28. When the pivoting motion of handle 112 is reversed with handle 112 now being moved back in the direction of arrow A in FIG. 6, the pump piston rises upwardly within pump cylinder 98 in a vacuum stroke to help drain or pull back the fluid that had previously been pumped against piston stop 66. This is aided by spring 76 acting to return piston stop 66 to its retracted position in first cylinder 68 in cover 52 of primary clutch 38 of CVT 28.

When the pump piston has risen to its uppermost position in pump cylinder 98, a bypass (not shown) in pump cylinder 98 is opened between upper port 120 and lower supply port 122 to allow any air bubbles that might have accumulated in the fluid being directed to CVT 28 to escape or be vented to atmosphere through reservoir 126. This helps the system of this invention remain properly calibrated so that repeated cycles of operation of pump 96 provide substantially the same result in how far piston stop 66 is extended from cover 52 of primary clutch 38 of CVT 28. An accumulation of air bubbles in the fluid would otherwise eventually lead to an error in how far piston stop 66 is extended.

Figure 7:
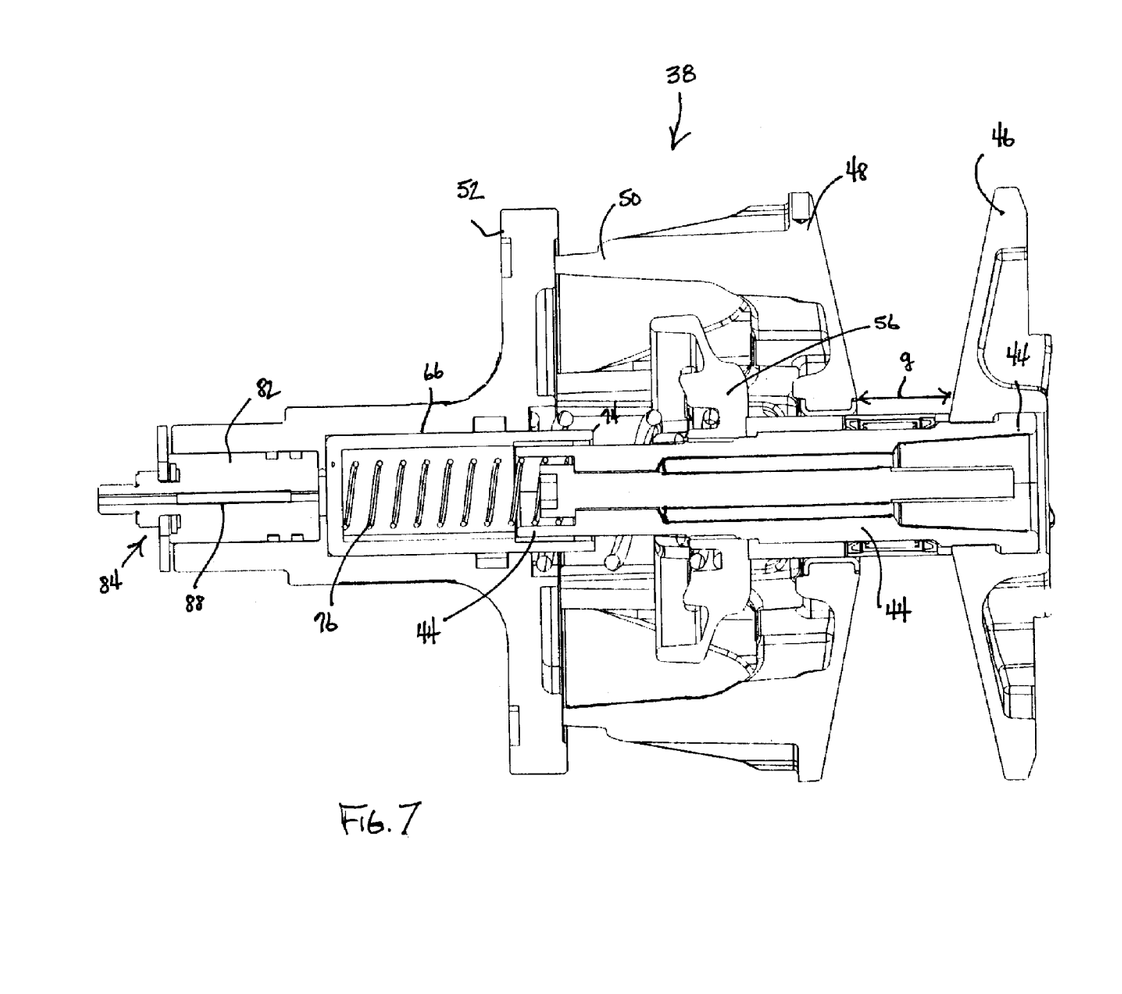
FIGS. 7-9 are similar cross-sectional views of the primary clutch of the CVT illustrating the different gaps or differences in distance between the fixed and movable sheaves of the primary clutch for different operational conditions of the primary clutch and different positions of the piston stop, namely with FIG. 7 illustrating the primary clutch at neutral with the piston stop fully retracted into the moveable sheave, FIG. 8 illustrating the primary clutch at full shift with the piston stop fully retracted into the moveable sheave, and FIG. 9 illustrating the primary clutch at full shift with the piston stop fully extended from the moveable sheave.
Figure 8:
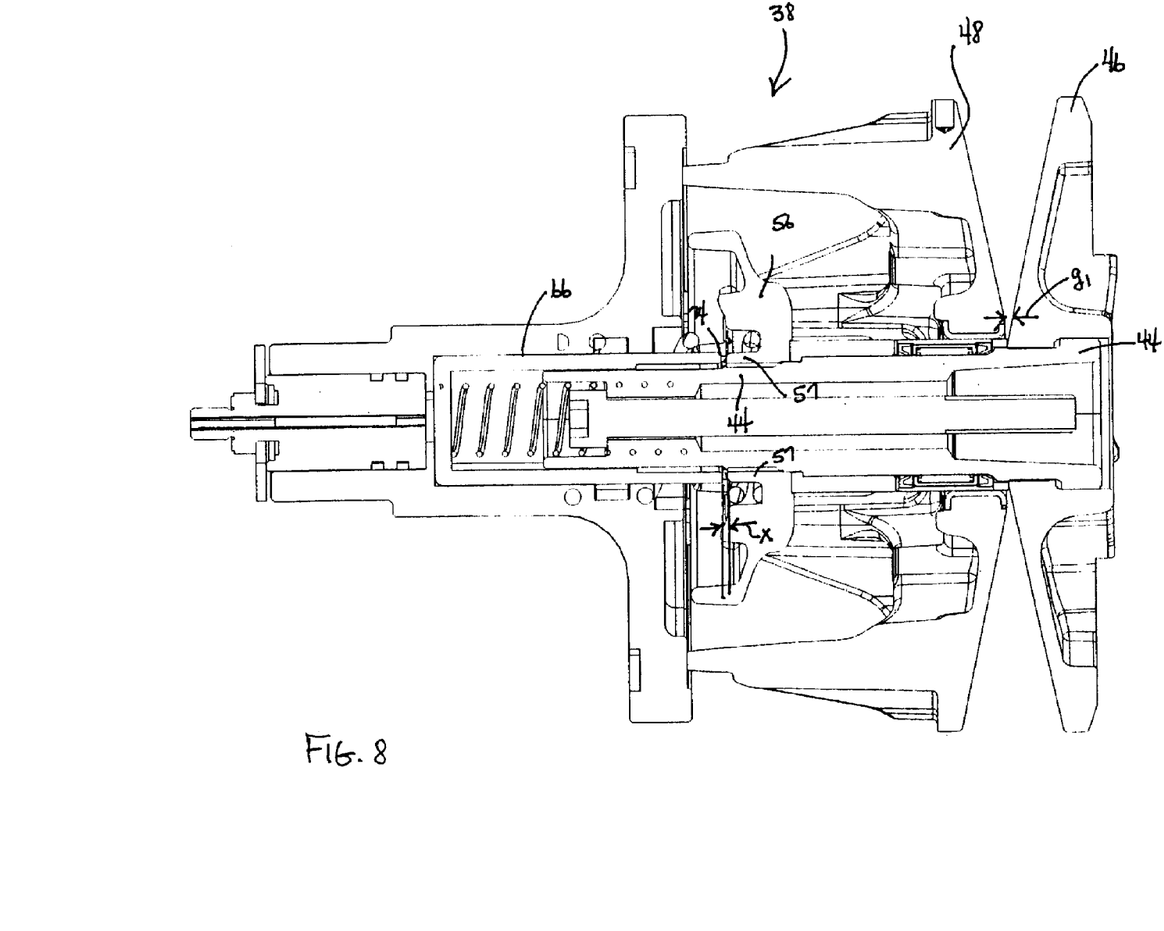
Figure 9:
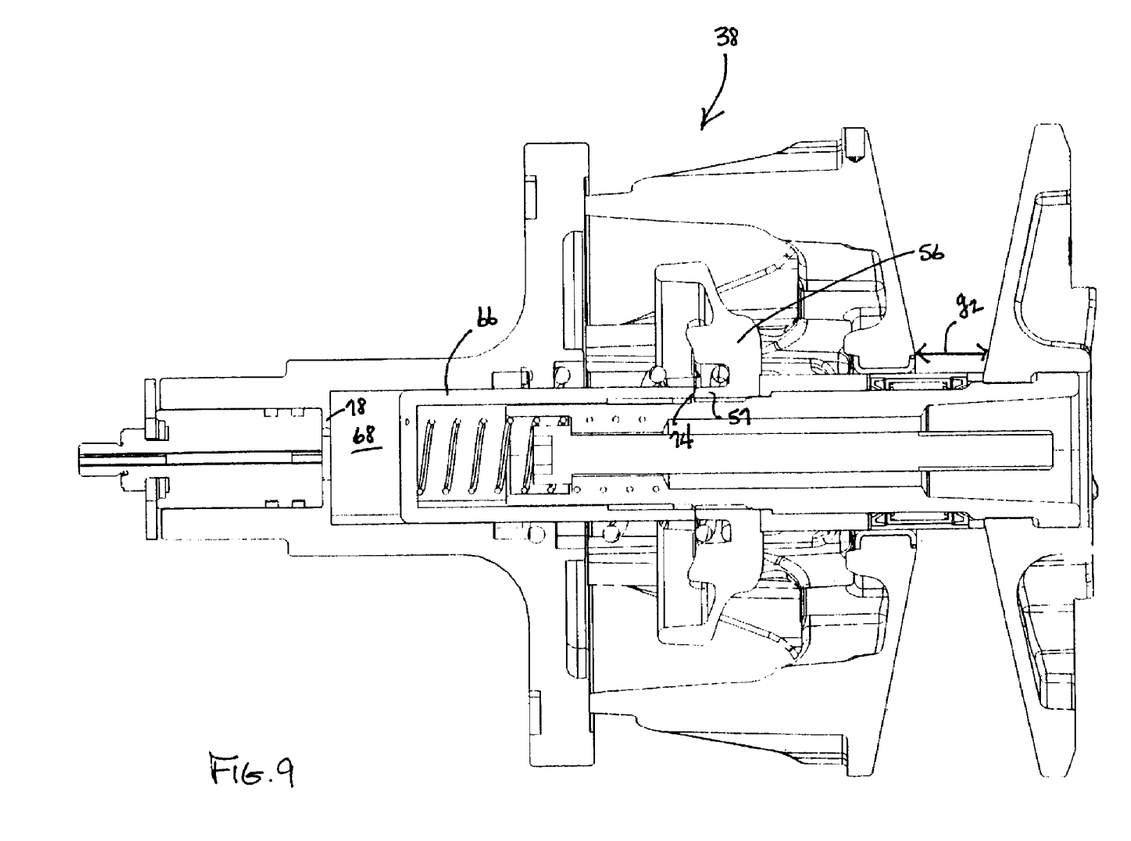

FIGS. 7-9 illustrate the operation of the system of this invention. For the most part and in many uses of vehicle 2, handle 112 of the pump 96 will be in the position shown in FIG. 6, namely with handle 112 against the leading edge of the large front detent $d_1$. In this position, piston stop 66 is fully retracted into first cylinder 68 in cover 52 of primary clutch 38 of CVT 28 and has no effect on the operation of CVT 28.

FIG. 7 illustrates CVT 28 with piston stop 66 fully retracted and with CVT 28 in neutral at an engine idle speed prior to CVT 28 engaging against belt 42 with enough force to begin rotation of belt 42. In this condition, fixed sheave 46 and movable sheave 48 of primary clutch 38 are spaced apart as far as they ever get with a maximum gap or distance being shown between them. This gap or distance is designated g in FIG. 7.

As engine rpm increases due to the driver stepping on the accelerator pedal and flyweights 54 in primary clutch 38 begin to pivot upwardly under the influence of centrifugal force, CVT 28 will upshift in its usual manner from its minimum transmission ratio to its maximum transmission ratio. FIG. 8 illustrates CVT 28 at full shift with piston stop 66 fully retracted as handle 112 remains in the position of FIG. 6. In this condition, fixed sheave 46 and movable sheave 48 of primary clutch 38 are as close to one another as they ever get with the gap or distance between them having disappeared at the bottom of the sheaves and with the gap or distance being much smaller everywhere else compared to FIG. 7. See the distance $g_1$ in FIG. 8 and compare to the distance g in FIG. 7. The difference between $g_1$ and g is sufficient to cause belt 42 to have ascended all the way to the top of fixed sheave 46 and movable sheave 48 of primary clutch 38 with belt 42 correspondingly lowering between fixed sheave 46 and movable sheave 48 of secondary clutch 40. Inwardly facing end 74 of hollow tube 70 that forms the retracted piston stop 66 remains spaced from hub 57 of spider 56 by the small distance x in FIG. 8 even at full shift of CVT 28 as long as piston stop 66 is fully retracted.

However, look at what happens when handle 112 of the fluid supply pump is selectively pivoted rearwardly by the driver in the direction of the arrow B in FIG. 6 all the way through slot 116 until handle 112 is received in detent $d_2$ that is farthest to the rear in detent plate 118. In this situation and when fluid supply pump 96 is properly calibrated, the pivoting of handle 112 causes the pump piston to pump a measured amount of fluid into first cylinder 68 in cover 52 of primary clutch 38 to extend piston stop 66 out of cover 52 in an inward direction relative to cover 52 by a predetermined distance. This is the condition shown in FIG. 9. Note that piston stop 66 has been extended out of first cylinder 68 compared to its retracted position as shown in FIGS. 7 and 8. In FIG. 9, piston stop 66 is in what would be its fully extended position.

Now, with piston stop 66 in its fully extended position, inwardly facing end 74 of hollow tube 70 that forms piston stop 66 will engage against hub 57 of spider 56 during operation of CVT 28 at some point that is well short of full shift. When such abutment occurs, CVT 28 becomes locked against further upshifting. This results in fixed sheave 46 and movable sheave 48 of CVT 28 having been moved towards one another by a distance that is much smaller than at full shift with no further movement towards one another being possible. This is shown by the distance $g_2$ in FIG. 9. Note that $g_2$ in FIG. 9 is somewhat less than g in FIG. 7 meaning the transmission has been able to upshift to a higher transmission ratio from its nominal minimum transmission ratio. However, $g_2$ in FIG. 9 is considerably greater than $g_1$ in FIG. 8 meaning that the maximum transmission ratio as established by the position of piston stop 66 in FIG. 9 will be substantially lower than the nominal maximum transmission ratio of CVT 28.

Desirably, when vehicle 2 is equipped with or converted to a sprayer, the substantially lower maximum transmission ratio as compared to the nominal maximum transmission ratio will be set low enough that it will be reached at a fairly low vehicle ground speed on flat ground, e.g. 3 mph or so. By maintaining a reasonably high engine rpm during operation, it will be fairly simple for the driver to keep vehicle 2 operating with the CVT continuously upshifted to the lowered maximum transmission ratio that has been chosen by the position of piston stop 66 even when vehicle 2 is driving over varying terrain. This then allows the application rate of any spray being put down by vehicle 2 to remain substantially constant as vehicle 2 goes from flat ground to uphill or downhill situations as the transmission ratio is being held at the lowered maximum transmission ratio, thereby allowing a computation of how much spray flow is required relative to the lowered maximum transmission ratio to achieve a desired application rate. Accordingly, even with the use of CVT 28 in drive train 10 of vehicle 2, the use of piston stop 66 to establish a lowered maximum transmission ratio in CVT 28 while spraying enables more effective use of vehicle 2 as a sprayer since the application rate of the spray, again measured by the amount of spray per unit of area, will remain substantially constant. Thus, the performance of vehicle 2 in this situation will be comparable to the performance of a vehicle 2 that utilizes a gear-shift based manual standard transmission even though vehicle 2 is equipped with CVT 28.

While the above description refers to use of vehicle 2 as a sprayer, the same rationale for using piston stop 66 would apply when vehicle 2 is being used for the application of other substances to the ground or turf surface that are desirably applied at a substantially constant application rate even when vehicle 2 is equipped with CVT 28. Such other uses would include, but not be limited to, use of vehicle 2 as a topdresser which applies a blended soil mixture over the surface of turf grass or as a spreader which applies a dry particulate fertilizer to the ground or turf surface.

The other detents $d_3$-$d_5$ allow the driver to set other lower maximum transmission ratios in CVT 28 that are higher than the lower maximum transmission ratio set when handle 112 is in detent $d_2$ but are lower than the nominal maximum transmission ratio set when handle 112 is in detent $d_1$. For example, this would make it possible for the driver to conveniently keep vehicle 2 operating at any one of a plurality of predetermined speeds that are lower than the usual transport speed, e.g. at 3 mph at detent $d_2$, 6 mph at detent $d_3$, and so on. A particular lowered speed may be desirable when vehicle 2 is equipped with ground working or grooming implements other than a sprayer, such as a top dresser. Or, an inexperienced driver may be required by his or her supervisor to drive vehicle 2 at a reduced speed by maintaining handle 112 in one of detents $d_2$-$d_5$.

Various modifications of this invention will be apparent to those skilled in the art. While the use of a fluid operated piston stop 66 as described herein is preferred for durability reasons, other types of stops including stops that are mechanically moved between their retracted and extended positions could be used on cover 52 of primary clutch 38 of CVT 28. Alternatively, rather than controlling moveable sheave 48 of primary clutch 38, the improvements of this invention could be used instead to control moveable sheave 48 of secondary clutch 40 in a similar manner as described herein. Thus, this invention is not to be limited to the details of the embodiment thereof as described herein.

The invention claimed is:

1. A belt type continuously variable transmission for the traction drive train of a vehicle, which comprises:
   (a) at least one pulley comprising an axially fixed sheave and an axially movable sheave carried on a rotatable shaft;
   (b) a flexible belt that engages between the sheaves;
   (c) a plurality of movable members that are responsive to centrifugal force for pushing the fixed sheave towards the movable sheave to thereby change the position of the belt between the sheaves to continuously change a transmission ratio provided by the transmission between a nominal minimum transmission ratio and a nominal maximum transmission ratio; and
   (d) a selectively deployable stop carried on the at least one pulley with the stop being selectively movable relative to the sheaves between a non-deployed position and at least one deployed position, the stop being configured such that in the non-deployed position thereof the stop has no effect on the transmission ratios available from the transmission such that the transmission can continuously shift between its nominal minimum and maximum transmission ratios, the stop being further configured such that in the at least one deployed position thereof the stop is repositioned on the at least one pulley to mechanically limit the relative motion between the fixed and movable sheaves to a range of motion that is smaller than a range of motion provided in normal operation of the transmission but without the stop protruding into the path of or interfering with the operation of the centrifugal force responsive members, wherein the stop in the at least one deployed position thereof provides an actual maximum transmission ratio that is lower than the nominal maximum transmission ratio but higher than the nominal minimum transmission ratio with the centrifugal force responsive members still being able to operate to continuously shift the transmission between the nominal minimum transmission ratio and the actual maximum transmission ratio set by the position of the stop in the at least one deployed position thereof.

2. The transmission of claim 1, wherein the stop axially slides relative to the shaft in moving back and forth between the non-deployed position thereof and the at least one deployed position thereof.

3. The transmission of claim 2, wherein the stop comprises a hollow tube with at least a portion of the hollow tube being concentrically received around the shaft in both the non-deployed and the deployed positions thereof such that the hollow tube is at least partially carried by the shaft.

4. The transmission of claim 2, wherein the stop is slid relative to the shaft into the at least one deployed position thereof by fluid pressure that is selectively applied against a piston portion of the stop to push the stop from the non-deployed position into the at least one deployed position.

5. The transmission of claim 4, further including a spring acting between the shaft and the stop for biasing the stop relative to the shaft into the non-deployed position thereof such that the spring is able to return the stop to the non-deployed position when the fluid pressure applied against the piston portion of the stop is selectively vented or released.

6. The transmission of claim 4, further including a fluid supply pump configured to be carried on the vehicle separately from the transmission for supplying the fluid pressure to a chamber in the at least one pulley, the piston portion of the stop being received in the chamber to allow the fluid pressure introduced into the chamber by the fluid supply pump to act against the piston portion of the stop.

7. The transmission of claim 6, wherein the fluid supply pump has a fluid supply hose for passing the fluid pressure into the chamber in the at least one pulley through a rotary union, the rotary union having a fitting to which the fluid supply hose is connected with the fitting and the fluid supply hose remaining stationary as a remaining portion of the rotary union rotates with the at least one pulley, the remaining rotating portion of the rotary union having at least one passageway for conducting the fluid pressure into the chamber in the at least one pulley.

8. The transmission of claim 6, wherein the fluid supply pump comprises:
   (a) a pump cylinder;
   (b) a pump piston housed within the pump cylinder for back and forth movement therein through a pump stroke to supply the fluid pressure to the chamber and through a return stroke to release or suction the fluid pressure out of the chamber;
   (c) a piston rod connected to the pump piston, wherein the piston rod has one end thereof extending externally of the pump cylinder during both the pump and return strokes of the pump piston such that the pump piston can be moved through both its pump and return strokes by applying force to the external end of the piston rod; and
   (d) a user operable handle on or operatively connected to the external end of the piston rod for allowing the user to apply hand force to the piston rod to allow the user to selectively manually move the pump piston through both its pump and return strokes.

9. The transmission of claim 8, wherein the handle is fixed to a first arm of a pivotal bell crank with a second arm of the bell crank being pivotally connected to the external end of the piston rod, wherein use of the handle to effect pivoting motion of the bell crank in opposite directions about a pivot axis of the bell crank causes reciprocal back and forth motion of the pump piston within the pump cylinder through both its pump and return strokes.

10. The transmission of claim 8, further including a plurality of detents for holding the handle in a plurality of adjusted positions corresponding to a plurality of pump strokes having different lengths such that the stop has a plurality of deployed positions that provide a plurality of different actual maximum transmission ratios any one of which may be selected by the user at any given time, wherein the handle is receivable in one selected detent at any given time to select for use the one actual maximum transmission ratio that corresponds with the one selected detent.

11. The transmission of claim 8, further including a bypass in the pump cylinder that is opened substantially at the conclusion of each return stroke of the pump piston for allowing any air bubbles that may have accumulated in the fluid being pumped by the fluid supply pump to vent to atmosphere.

12. The transmission of claim 1, wherein a plurality of deployed positions are provided for the stop with the stop being capable of being retained in any one of the deployed positions at any given time, whereby a plurality of different actual maximum transmission ratios are available for selection by a user depending upon which of the available deployed positions of the stop are selected for use by the user.

13. The transmission of claim 1, wherein the stop is at least partially carried on the movable sheave of the at least one pulley.

14. The transmission of claim 13, wherein the stop comprises a hollow tube that is at least partially received within a cylinder in a central portion of the movable sheave with the cylinder and tube being coaxial with the shaft of the pulley, wherein one end of the hollow tube is also at least partially concentrically received around one end of the rotatable shaft of the pulley, and wherein the tube is slidable relative to the cylinder and the shaft as it moves back and forth between the non-deployed position and the at least one deployed position thereof.

15. The transmission of claim 14, wherein the movable sheave comprises:
   (a) a tapered belt engaging face;
   (b) a plurality of circumferentially spaced posts that project from a backside of the belt engaging face; and
   (c) a cover attached to the posts such that the cover and posts form a cage-like structure projecting to one side of the movable sheave with the cage-like structure comprising part of the movable sheave in terms of rotary and axial motion of the movable sheave, and wherein the cylinder that at least partially receives the hollow tube is provided on a central portion of the cover of the movable sheave.

16. The transmission of claim 14, wherein the hollow tube has a closed end that forms a piston that is received for sliding within the cylinder in a fluid-tight relationship, and wherein the hollow tube is moved from the non-deployed position thereof to the at least one deployed position by the application of fluid pressure into the cylinder to act on the closed end of the hollow tube.

17. The transmission of claim 16, further including a spring extending into the hollow tube with one end of the spring bearing against a backside of the closed end of the hollow tube and an opposite end of the spring bearing against one end of the shaft to bias the hollow tube towards the non-deployed position thereof such that the spring is able to return the stop to the non-deployed position when the fluid pressure is selectively vented or released from the cylinder.

18. A utility vehicle for performing operations on a ground or turf surface, which comprises:
   (a) a frame that is supported for rolling over the ground by a plurality of ground engaging wheels;
   (b) a prime mover carried on the frame with the prime mover having a rotatable drive shaft;
   (c) a drive train operatively connected to at least one wheel for rotatably driving the at least one wheel for propelling the frame over the ground or turf surface, the drive train including a belt type continuously variable transmission operatively connected between the drive shaft of the prime mover and the at least one wheel for driving the at least one wheel and thereby the frame at variable ground speeds, the transmission comprising:
      (i) at least one pulley comprising an axially fixed sheave and an axially movable sheave carried on a rotatable shaft;
      (ii) a flexible belt that engages between the sheaves;
      (iii) a plurality of movable members that are responsive to centrifugal force for pushing the fixed sheave towards the movable sheave to thereby change the position of the belt between the sheaves to continuously change a transmission ratio provided by the transmission between a nominal minimum transmission ratio and a nominal maximum transmission ratio; and
      (iv) a selectively deployable stop carried on the at least one pulley with the stop being selectively movable relative to the sheaves between a non-deployed position and at least one deployed position, the stop being configured such that in the non-deployed position thereof the stop has no effect on the transmission ratios available from the transmission such that the transmission can continuously shift between its nominal minimum and maximum transmission ratios, the stop being further configured such that in the at least one deployed position thereof the stop is repositioned on the at least one pulley to mechanically limit the relative motion between the fixed and movable sheaves to a range of motion that is smaller than a range of motion provided in normal operation of the transmission, whereby the stop in the at least one deployed position thereof provides an actual maximum transmission ratio that is lower than the nominal maximum transmission ratio but higher than the nominal minimum transmission ratio to limit a maximum ground speed of the frame; and
   (d) an applicator operatively attached to the frame for being propelled over the ground or turf surface by motion of the frame over the ground or turf surface, wherein the applicator is operatively powered directly or indirectly by the drive shaft of the prime mover for dispensing substances onto the ground or turf surface at an application rate proportional to the rotational speed of the drive shaft of the prime mover, wherein a desired application rate for such substances can be calculated and set for the ground speed of the frame when the stop of the transmission is in the at least one deployed position thereof establishing the actual maximum transmission ratio, whereby the application rate of the substance will remain substantially constant when the utility vehicle is operated by the user with the transmission upshifted to the actual maximum transmission ratio established by the at least one deployed position of the stop even though the rotational speed of the drive shaft of the prime mover may vary as the utility vehicle goes up or down hills.

19. The vehicle of claim 18, wherein the transmission includes a primary pulley and a secondary pulley each of which have the structure set forth in limitations (c)(i), c(ii) and c(iii) of claim 18 with the flexible belt of limitation c(ii) of claim 18 comprising a single flexible belt entrained around both the primary pulley and secondary pulley in an opposite manner such that the belt falls between the sheaves of the secondary pulley as the belt rises between the sheaves of the primary pulley and vice versa, wherein the rotatable shaft of the primary pulley is operatively connected to the drive shaft of the prime mover and the rotatable shaft of the secondary pulley is operatively connected to downstream portions of the drive train operatively connected to the at least one wheel, and wherein the stop of limitation (c)(iv) of claim 18 may be located on either the primary pulley or the secondary pulley.

20. The vehicle of claim 19, wherein the stop is carried on the movable sheave of whichever pulley has the stop.

\* \* \* \* \*

UNITED STATES PATENT AND TRADEMARK OFFICE
CERTIFICATE OF CORRECTION

PATENT NO.         : 9,010,466 B2  
APPLICATION NO.    : 14/273134  
DATED              : April 21, 2015  
INVENTOR(S)        : Jamie R. Larson Page 1 of 1

It is certified that error appears in the above-identified patent and that said Letters Patent is hereby corrected as shown below:

In the Claims

Col. 11, Lines 9-10, Claim 1, change "pushing the fixed sheave towards the movable sheave" to --pushing the movable sheave towards the fixed sheave--; and Col. 13, Lines 53-54, Claim 18, change "pushing the fixed sheave towards the movable sheave" to --pushing the movable sheave towards the fixed sheave--.

Signed and Sealed this
Eighth Day of September, 2015

Michelle K. Lee
*Director of the United States Patent and Trademark Office*